(12) United States Patent     (10) Patent No.:   US 12,656,877 B2

Kuwahara et al.     (45) Date of Patent:    Jun. 16, 2026

(54) SIGNAL PROCESSING METHOD, SIGNAL PROCESSING DEVICE, GESTURE RECOGNITION SYSTEM, AND SIGNAL PROCESSING PROGRAM

(71) Applicant: Socionext Inc., Kanagawa (JP)

(72) Inventors: Yuji Kuwahara, Yokohama (JP); Daiki Cho, Yokohama (JP)

(73) Assignee: Socionext Inc., Kanagawa (JP)

( * ) Notice: Subject to any disclaimer, the term of this patent is extended or adjusted under 35 U.S.C. 154(b) by 276 days.

(21) Appl. No.: 18/629,153

(22) Filed: Apr. 8, 2024

(65) Prior Publication Data

US 2024/0256053 A1    Aug. 1, 2024

Related U.S. Application Data

(63) Continuation of application No. PCT/JP2022/037667, filed on Oct. 7, 2022.

(60) Provisional application No. 63/255,479, filed on Oct. 14, 2021.

(51) Int. Cl.
   *G01S 13/06*       (2006.01)
   *G01S 13/50*       (2006.01)
   *G06F 3/01*        (2006.01)

(52) U.S. Cl.
   CPC .............. *G06F 3/017* (2013.01); *G01S 13/06* (2013.01); *G01S 13/50* (2013.01)

(58) Field of Classification Search
   CPC . G06F 3/017; G06F 3/01; G01S 13/06; G01S 13/50; G01S 7/414; G01S 7/415; G01S 13/343; G01S 13/588; G01S 13/723; G01S 13/89
   See application file for complete search history.

(56) References Cited

U.S. PATENT DOCUMENTS

2014/0307919 A1* 10/2014 Yamashita ............. G06V 40/28
                                         382/103
2018/0173318 A1* 6/2018 Kim ....................... G06V 40/28

(Continued)

FOREIGN PATENT DOCUMENTS

| JP | 2013-003961 | 1/2013 |
|---|---|---|
| JP | 2016-038621 | 3/2016 |
| WO | 2019/202670 | 10/2019 |

OTHER PUBLICATIONS

International Search Report for PCT/JP2022/037667 mailed on Dec. 20, 2022.

(Continued)

*Primary Examiner* — Rinna Yi

(74) *Attorney, Agent, or Firm* — IPUSA, PLLC

(57)        ABSTRACT

A signal processing method is executed by a signal processing device connected to a radio device that transmits radio waves in given periods and receives reflection waves, to process signals of the reflection waves. The signal processing method includes: obtaining positional information on a moving object at respective times based on the signals of the reflection waves; identifying a coordinate that is a coordinate in an axis in a transmission direction of the radio waves, and satisfies an end condition of a gesture from among the obtained positional information at the respective times; and extracting a group of consecutive coordinates including the identified coordinate as an end point.

20 Claims, 16 Drawing Sheets

(56)  References Cited

U.S. PATENT DOCUMENTS

| | | | | |
|---|---|---|---|---|
| 2021/0026458 A1* | 1/2021 | Tanaka | .................... | G06F 3/165 |
| 2021/0081104 A1* | 3/2021 | Chung | .................. | G06V 10/82 |

OTHER PUBLICATIONS

Written Opinion of The International Searching Authority for PCT/
JP2022/037667 mailed on Dec. 20, 2022.

* cited by examiner

FIG.6

600 — POSITIONAL INFORMATION

| TIME | COORDINATE DATA |
|---|---|
| $t_1$ | $(x_1,y_1,z_1)$ |
| $t_2$ | $(x_2,y_2,z_2)$ |
| $t_3$ | $(x_3,y_3,z_3)$ |
| $t_4$ | $(x_4,y_4,z_4)$ |
| $t_5$ | $(x_5,y_5,z_5)$ |
| $t_6$ | $(x_6,y_6,z_6)$ |
| $t_7$ | $(x_7,y_7,z_7)$ |
| $t_8$ | $(x_8,y_8,z_8)$ |
| $t_9$ | $(x_9,y_9,z_9)$ |
| $t_{10}$ | $(x_{10},y_{10},z_{10})$ |
| $t_{11}$ | $(x_{11},y_{11},z_{11})$ |
| $t_{12}$ | $(x_{12},y_{12},z_{12})$ |
| $t_{13}$ | $(x_{13},y_{13},z_{13})$ |
| $t_{14}$ | $(x_{14},y_{14},z_{14})$ |
| $t_{15}$ | $(x_{15},y_{15},z_{15})$ |
| $t_{16}$ | $(x_{16},y_{16},z_{16})$ |
| $t_{17}$ | $(x_{17},y_{17},z_{17})$ |
| $\cdots$ | $\cdots$ |

610 — DETERMINATION INFORMATION

| TIME | ADJACENT DIFFERENCE DATA | MOVEMENT |
|---|---|---|
| $t_1$ | $(x_2,y_2,z_2) - (x_1,y_1,z_1)$ | – |
| $t_2$ | $(x_3,y_3,z_3) - (x_2,y_2,z_2)$ | – |
| $t_3$ | $(x_4,y_4,z_4) - (x_3,y_3,z_3)$ | ○ |
| $t_4$ | $(x_5,y_5,z_5) - (x_4,y_4,z_4)$ | ○ |
| $t_5$ | $(x_6,y_6,z_6) - (x_5,y_5,z_5)$ | ○ |
| $t_6$ | $(x_7,y_7,z_7) - (x_6,y_6,z_6)$ | ○ |
| $t_7$ | $(x_8,y_8,z_8) - (x_7,y_7,z_7)$ | ○ |
| $t_8$ | $(x_9,y_9,z_9) - (x_8,y_8,z_8)$ | ○ |
| $t_9$ | $(x_{10},y_{10},z_{10}) - (x_9,y_9,z_9)$ | ○ |
| $t_{10}$ | $(x_{11},y_{11},z_{11}) - (x_{10},y_{10},z_{10})$ | ○ |
| $t_{11}$ | $(x_{12},y_{12},z_{12}) - (x_{11},y_{11},z_{11})$ | ○ |
| $t_{12}$ | $(x_{13},y_{13},z_{13}) - (x_{12},y_{12},z_{12})$ | ○ |
| $t_{13}$ | $(x_{14},y_{14},z_{14}) - (x_{13},y_{13},z_{13})$ | ○ |
| $t_{14}$ | $(x_{15},y_{15},z_{15}) - (x_{14},y_{14},z_{14})$ | ○ |
| $t_{15}$ | $(x_{16},y_{16},z_{16}) - (x_{15},y_{15},z_{15})$ | ○ |
| $t_{16}$ | $(x_{17},y_{17},z_{17}) - (x_{16},y_{16},z_{16})$ | ○ |
| $t_{17}$ | – | – |
| $\cdots$ | $\cdots$ | $\cdots$ |

620 — POSITIONAL INFORMATION AT RESPECTIVE TIMES

| TIME | COORDINATE DATA |
|---|---|
| $t_3$ | $(x_3,y_3,z_3)$ |
| $t_4$ | $(x_4,y_4,z_4)$ |
| $t_5$ | $(x_5,y_5,z_5)$ |
| $t_6$ | $(x_6,y_6,z_6)$ |
| $t_7$ | $(x_7,y_7,z_7)$ |
| $t_8$ | $(x_8,y_8,z_8)$ |
| $t_9$ | $(x_9,y_9,z_9)$ |
| $t_{10}$ | $(x_{10},y_{10},z_{10})$ |
| $t_{11}$ | $(x_{11},y_{11},z_{11})$ |
| $t_{12}$ | $(x_{12},y_{12},z_{12})$ |
| $t_{13}$ | $(x_{13},y_{13},z_{13})$ |
| $t_{14}$ | $(x_{14},y_{14},z_{14})$ |
| $t_{15}$ | $(x_{15},y_{15},z_{15})$ |
| $t_{16}$ | $(x_{16},y_{16},z_{16})$ |

FIG.8

620 — POSITIONAL INFORMATION AT RESPECTIVE TIMES

| TIME | COORDINATE DATA |
|---|---|
| $t_3$ | $(x_3, y_3, z_3)$ |
| $t_4$ | $(x_4, y_4, z_4)$ |
| $t_5$ | $(x_5, y_5, z_5)$ |
| $t_6$ | $(x_6, y_6, z_6)$ |
| $t_7$ | $(x_7, y_7, z_7)$ |
| $t_8$ | $(x_8, y_8, z_8)$ |
| $t_9$ | $(x_9, y_9, z_9)$ |
| $t_{10}$ | $(x_{10}, y_{10}, z_{10})$ |
| $t_{11}$ | $(x_{11}, y_{11}, z_{11})$ |
| $t_{12}$ | $(x_{12}, y_{12}, z_{12})$ |
| $t_{13}$ | $(x_{13}, y_{13}, z_{13})$ |
| $t_{14}$ | $(x_{14}, y_{14}, z_{14})$ |
| $t_{15}$ | $(x_{15}, y_{15}, z_{15})$ |
| $t_{16}$ | $(x_{16}, y_{16}, z_{16})$ |

710 — DEPTH DATA

| TIME | z-COORDINATE |
|---|---|
| $t_3$ | $z_3$ |
| $t_4$ | $z_4$ |
| $t_5$ | $z_5$ |
| $t_6$ | $z_6$ |
| $t_7$ | $z_7$ |
| $t_8$ | $z_8$ |
| $t_9$ | $z_9$ |
| $t_{10}$ | $z_{10}$ |
| $t_{11}$ | $z_{11}$ |
| $t_{12}$ | $z_{12}$ |
| $t_{13}$ | $z_{13}$ |
| $t_{14}$ | $z_{14}$ |
| $t_{15}$ | $z_{15}$ |
| $t_{16}$ | $z_{16}$ |

810 — FIRST DEPTH DIFFERENCE (CASE OF i = 2)

$z_4 - z_3$, $z_4 - z_4$, $z_5$, $z_6$, $z_7$, $z_8$, $z_9$, $z_{10}$, $z_{11}$, $z_{12}$, $z_{13}$, $z_{14}$, $z_{15}$, $z_{16}$

820 — FIRST DEPTH DIFFERENCE (CASE OF i = 13)

$z_{15} - z_3$, $z_{15} - z_4$, $z_{15} - z_5$, $z_{15} - z_6$, $z_{15} - z_7$, $z_{15} - z_8$, $z_{15} - z_9$, $z_{15} - z_{10}$, $z_{15} - z_{11}$, $z_{15} - z_{12}$, $z_{15} - z_{13}$, $z_{15} - z_{14}$, $z_{15} - z_{15}$, $z_{16}$

830 — GROUP OF CONSECUTIVE z-COORDINATES

| TIME | DATA NUMBER n | DEPTH DATA | FIRST DEPTH DIFFERENCE |
|---|---|---|---|
| $t_3$ | 0 | 60 | 90 |
| $t_4$ | 1 | 30 | 120 |
| $t_5$ | 2 | 15 | 135 |
| $t_6$ | 3 | 16 | 134 |
| $t_7$ | 4 | 14 | 136 |
| $t_8$ | 5 | 12 | 138 |
| $t_9$ | 6 | 14 | 136 |
| $t_{10}$ | 7 | 18 | 132 |
| $t_{11}$ | 8 | 18 | 132 |
| $t_{12}$ | 9 | 85 | 65 |
| $t_{13}$ | 10 | 105 | 45 |
| $t_{14}$ | 11 | 120 | 30 |
| $t_{15}$ | 12 | 150 | 0 |

FIG.10

Table 1020 — GROUP OF CONSECUTIVE z-COORDINATES AFTER DELETION

| DATA NUMBER n | DEPTH DATA | SECOND DEPTH DIFFERENCE |
|---|---|---|
| 2 | 15 | 3 |
| 3 | 16 | 4 |
| 4 | 14 | 2 |
| 5 | 12 | 0 |
| 6 | 14 | 2 |
| 7 | 18 | 6 |
| 8 | 18 | 6 |

Table 1010 — GROUP OF CONSECUTIVE z-COORDINATES

| DATA NUMBER n | DEPTH DATA | SECOND DEPTH DIFFERENCE |
|---|---|---|
| 0 | 60 | 48 |
| 1 | 30 | 18 |
| 2 | 15 | 3 |
| 3 | 16 | 4 |
| 4 | 14 | 2 |
| 5 | 12 | 0 |
| 6 | 14 | 2 |
| 7 | 18 | 6 |
| 8 | 18 | 6 |
| 9 | 85 | 73 |
| 10 | 105 | 93 |
| 11 | 120 | 108 |
| 12 | 150 | 138 |

Table 830 — GROUP OF CONSECUTIVE z-COORDINATES

| DATA NUMBER n | DEPTH DATA | FIRST DEPTH DIFFERENCE |
|---|---|---|
| 0 | 60 | 90 |
| 1 | 30 | 120 |
| 2 | 15 | 135 |
| 3 | 16 | 134 |
| 4 | 14 | 136 |
| 5 | 12 | 138 |
| 6 | 14 | 136 |
| 7 | 18 | 132 |
| 8 | 18 | 132 |
| 9 | 85 | 65 |
| 10 | 105 | 45 |
| 11 | 120 | 30 |
| 12 | 150 | 0 |

1020

GROUP OF CONSECUTIVE z-COORDINATES AFTER DELETION

| DATA NUMBER n | DEPTH DATA | SECOND DEPTH DIFFERENCE |
|---|---|---|
| 2 | 15 | 3 |
| 3 | 16 | 4 |
| 4 | 14 | 2 |
| 5 | 12 | 0 |
| 6 | 14 | 2 |
| 7 | 18 | 6 |
| 8 | 18 | 6 |

1210

GROUP OF CONSECUTIVE z-COORDINATES AFTER DELETION

| DATA NUMBER n | DEPTH DATA | TIME RANGE |
|---|---|---|
| 2 | 15 | 20% IN FIRST HALF |
| 3 | 16 | |
| 4 | 14 | |
| 5 | 12 | |
| 6 | 14 | |
| 7 | 18 | |
| 8 | 18 | 20% IN SECOND HALF |

1220 z-COORDINATES INCLUDED IN TIME RANGE

| DATA NUMBER n | DEPTH DATA |
|---|---|
| 3 | 16 |
| 4 | 14 |
| 5 | 12 |
| 6 | 14 |
| 7 | 18 |

1230

POSITIONAL INFORMATION ON GROUP FOR RECOGNITION

| TIME | COORDINATE DATA |
|---|---|
| $t_4$ | $(x_4, y_4, z_4)$ |
| $t_5$ | $(x_5, y_5, z_5)$ |
| $t_6$ | $(x_6, y_6, z_6)$ |
| $t_7$ | $(x_7, y_7, z_7)$ |
| $t_8$ | $(x_8, y_8, z_8)$ |

SIGNAL PROCESSING METHOD, SIGNAL PROCESSING DEVICE, GESTURE RECOGNITION SYSTEM, AND SIGNAL PROCESSING PROGRAM

CROSS-REFERENCE TO RELATED APPLICATIONS

This U.S. non-provisional application is a continuation application of and claims the benefit of priority under 35 U.S.C. § 365(c) from PCT International Application PCT/JP2022/037667 filed on Oct. 7, 2022, which is designated the U.S., and is based on and claims priority to U.S. provisional application No. 63/255,479 filed on Oct. 14, 2021, the entire contents of which are incorporated herein by reference.

TECHNICAL FIELD

The present disclosure relates to a signal processing method, a signal processing device, a gesture recognition system, and a signal processing program.

BACKGROUND ART

Gesture recognition systems using radio signals to recognize gestures have been known. According to such a gesture recognition system, for example, the user can operate a device to be operated from a distant position without touching the device to be operated.

RELATED ART DOCUMENTS

Patent Documents

Patent Document 1: WO2019/202670

However, in the case of the gesture recognition system described above, when a movement other than a movement related to recognition of a gesture is detected as reflection waves (i.e., if the reflection waves include reflection signals that are not necessary for recognizing the gesture), the recognition accuracy of the gesture is reduced.

SUMMARY

According to an aspect in the present disclosure, a signal processing method is executed by a signal processing device connected to a radio device that transmits radio waves in given periods and receives reflection waves, to process signals of the reflection waves. The signal processing method includes: obtaining positional information on a moving object at respective times based on the signals of the reflection waves; identifying a coordinate that is a coordinate in an axis in a transmission direction of the radio waves, and satisfies an end condition of a gesture from among the obtained positional information at the respective times; and extracting a group of consecutive coordinates including the identified coordinate as an end point.

BRIEF DESCRIPTION OF DRAWINGS

FIG. 6 is a diagram illustrating an example of information used in the positional information calculation unit;
FIG. 8 is a diagram illustrating an example of information used in the distinguishing unit;
FIG. 10 is a diagram illustrating an example of information used in the distance range extraction unit;
FIG. 12 is a diagram illustrating an example of information used in the time range extraction unit;
FIG. 14 is a second diagram illustrating an example of use of a gesture recognition system.

DESCRIPTION OF EMBODIMENTS

Figure 1:
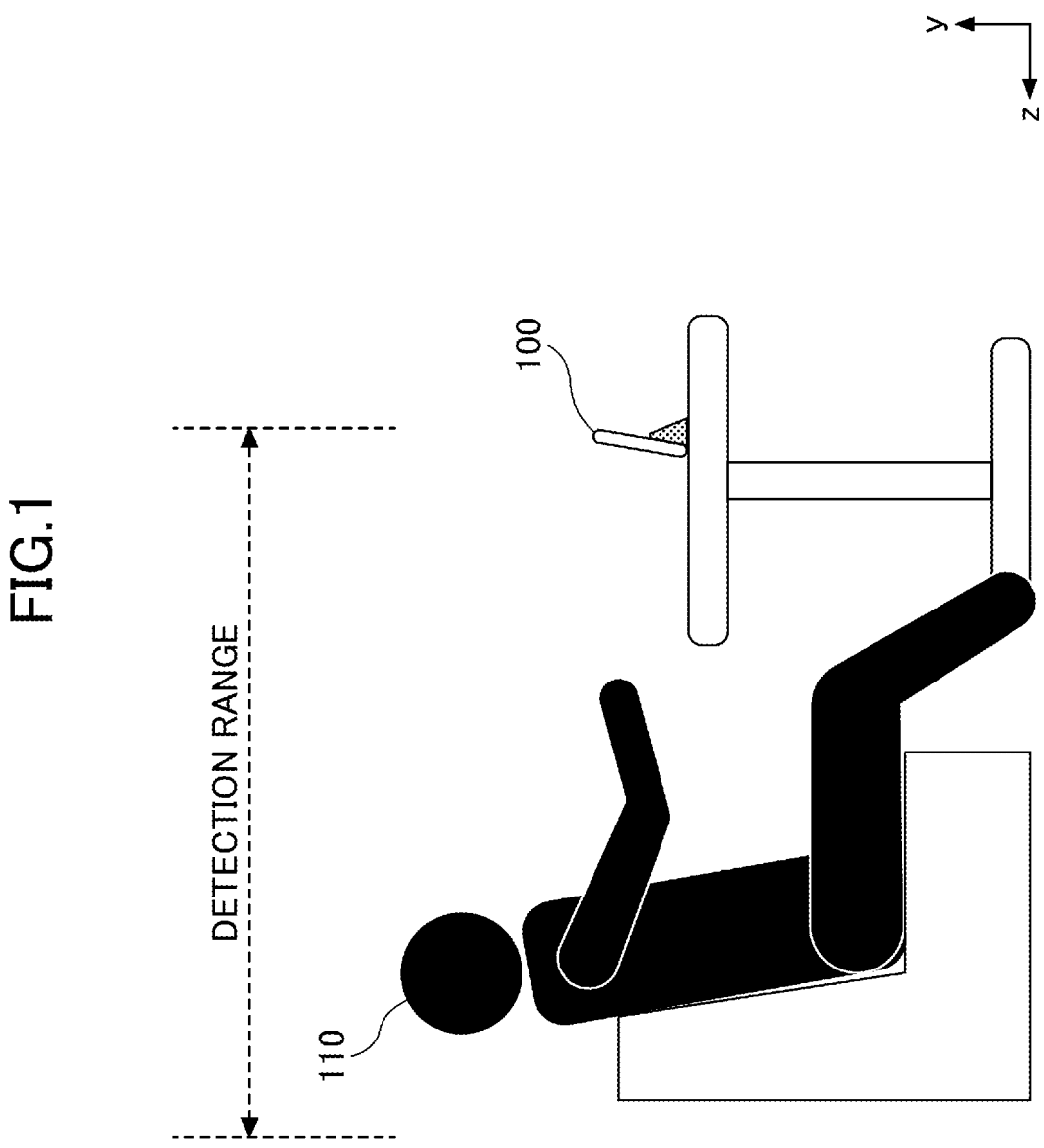
FIG. 1 is a first diagram illustrating an example of use of a gesture recognition system.

In the following, the respective embodiments will be described with reference to the accompanying drawings. Note that in the specification and the drawings, the same reference numerals are assigned to components having substantially the same functional configuration, and duplicate description will be omitted.

According to the embodiments in the present disclosure, the recognition accuracy of a gesture can be improved.

First Embodiment

Use Example of Gesture Recognition System

First, a use example of a gesture recognition system will be described. FIG. 1 is a first diagram illustrating an example of use of a gesture recognition system. As illustrated in FIG. 1, in the present embodiment, although a case where the gesture recognition system is implemented on a mobile terminal 100 will be described, the gesture recognition system may be implemented on one or more devices other than the mobile terminal 100. For example, the gesture recognition system may be implemented on an artificial intelligence (AI) speaker with a display. Alternatively, the gesture recognition system may be implemented on smart glasses, an in-vehicle device (e.g., a device installed in the center console of a vehicle), or the like. Alternatively, the gesture recognition system may be implemented by operating these devices as the recognition device, separately preparing a signal processing device (and a radar device), and combining the recognition device and the signal processing device (and the radar device).

As illustrated in FIG. 1, in the case where the gesture recognition system is implemented on the mobile terminal 100, the mobile terminal 100 is placed, for example, on a table, and a user 110 makes a gesture with a hand in a direction in which the mobile terminal 100 transmits radio signals. In other words, in the present embodiment, an object moving for a gesture=hand.

Specifically, the user 110 makes gestures in the following order:

A) holding out a hand into a space in front of the mobile terminal 100, the space being positioned in a direction in which the mobile terminal 100 transmits radio signals;

B) moving the hand along a plane that is substantially orthogonal to a direction in which the mobile terminal 100 transmits radio signals; and C) withdrawing the hand from the space in front of the mobile terminal 100, the space being positioned in the direction in which the mobile terminal 100 transmits radio signals.

When the user 110 performs the movements a) to c), the mobile terminal 100 recognizes the movement b) as a gesture.

Note that as illustrated in FIG. 1, in the present embodiment, an axis in the direction of transmission of radio signals by the mobile terminal 100 is defined as the z-axis, and an axis in the vertical direction among two axes forming a plane substantially orthogonal to the z-axis direction is defined as the y-axis. In addition, although not illustrated in FIG. 1, the horizontal axis (axis in the depth direction of the paper) among the two axes forming the plane substantially orthogonal to the z-axis direction is defined as the x-axis.

In addition, in the present embodiment, the radio signal transmitted by the mobile terminal 100 is assumed to be a signal modulated by a frequency modulated continuous wave radar (FMCW) modulation method.

In addition, in the present embodiment, the mobile terminal 100 sets a predetermined distance range from the mobile terminal 100 as a detection range, receives a reflection wave from a position of the hand of the user 110 closest to the mobile terminal 100 (e.g., the position of one of the fingertips of the user 110), and executes signal processing. Accordingly, the mobile terminal 100 calculates positional information (the x coordinate, y coordinate, and z-coordinate) on the position of the hand of the user 110 (i.e., the position of a moving object).

Note that in the present embodiment, the mobile terminal 100 is configured to delete:

a reflection wave received before the user 110 performs a gesture, or a reflection wave received after performing the gesture (e.g., the reflection wave upon a) or c) described above); and a reflection wave from an object (e.g., the trunk of the user 110 or an object around the user 110) other than object moving for a gesture (in the present embodiment, the hand of the user 110), by signal processing (i.e., deletes reflection signals not necessary for recognizing the gesture by signal processing), and then, executes recognition processing of the gesture. Accordingly, the mobile terminal 100 can improve the recognition accuracy of the gesture.

<Hardware Configuration of Mobile Terminal>

Figure 2:
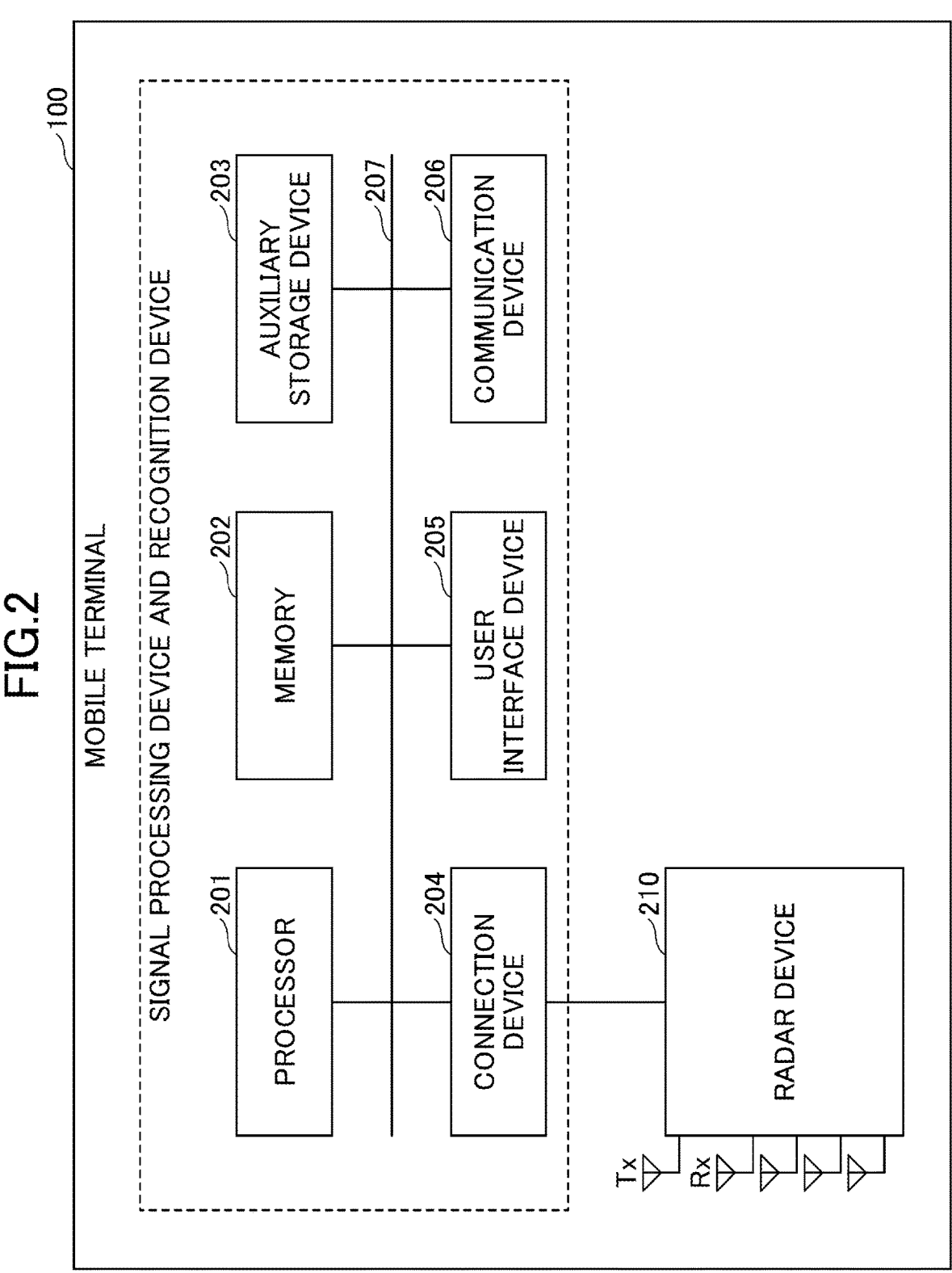
FIG. 2 is a diagram illustrating an example of a hardware configuration of a mobile terminal.

Next, a hardware configuration of the mobile terminal 100 will be described. FIG. 2 is a diagram illustrating an example of a hardware configuration of a mobile terminal.

As illustrated in FIG. 2, the mobile terminal 100 includes a processor 201, a memory 202, an auxiliary storage device 203, a connection device 204, a user interface device 205, a communication device 206, and a radar device 210. Note that in the mobile terminal 100, the hardware components ranging from the processor 201 to the communication device 206 are connected to each other via a bus 207, and these hardware components operate as a signal processing device and a recognition device. However, the signal processing device and the recognition device may share the hardware components as illustrated in FIG. 2, or may be configured by separate hardware components. Alternatively, as described above, the signal processing device together with the radar device 210 may be configured as a device separate from the mobile terminal 100.

The processor 201 includes various processing devices such as a central processing unit (CPU) and a graphics processing unit (GPU). The processor 201 reads various programs (e.g., a signal processing program, a gesture recognition program, and the like that will be described later) onto the memory 202 and executes the programs.

The memory 202 includes a main memory device such as a read-only memory (ROM) and a random access memory (RAM). The processor 201 and the memory 202 constitute what-is-called a computer, and by having the processor 201 execute various programs read on the memory 202, the computer implements various functions.

The auxiliary storage device 203 stores various programs and various items of data used when the various programs are executed by the processor 201.

The connection device 204 is a connection device that is connected to the radar device 210. The user interface device 205 receives various operations performed by the user 110 on the mobile terminal 100. In addition, the user interface device 205 outputs results of various processes performed by the mobile terminal 100 to the user 110. The communication device 206 is a communication device for communicating with an external device (not illustrated) via a network. Note that the various programs installed in the auxiliary storage device 203 are installed, for example, by downloading the programs from a network via the communication device 206.

The radar device 210 is an example of a radio device, and transmits radio signals modulated by an FMCW modulation method in a predetermined period to receive a reflection wave from a position closest to the transmission position. The example in FIG. 2 illustrates that one transmitter for transmitting radio signals and four receivers for receiving reflection waves are included.

Specific Examples of Positional Information

Figure 3:
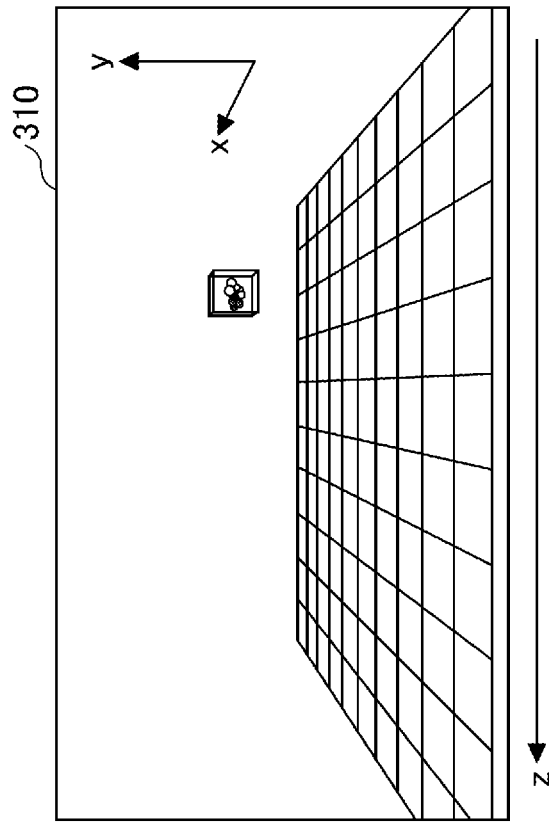
FIG. 3 is a diagram illustrating specific examples of positional information calculated by signal processing applied to received reflection waves.

Next, positional information on the hand of the user 110 calculated by signal processing applied to received reflection waves will be described. FIG. 3 is a diagram illustrating specific examples of positional information calculated by signal processing applied to received reflection waves. Among these, white circles in a reference numeral 310 indicate positional information on the hand of the user 110 during a gesture in the three dimensional space at the respective times.

In addition, white circles in a reference numeral 320 indicate positional information on the hand of the user 110 including before, during, and after a gesture in the three dimensional space at the respective times. In the reference numeral 320, white circles positioned outside a rectangular region are items of positional information that are not necessary for recognizing the gesture, and are the items of positional information to be deleted by signal processing.

<Functional Configuration of Mobile Terminal>

Figure 4:
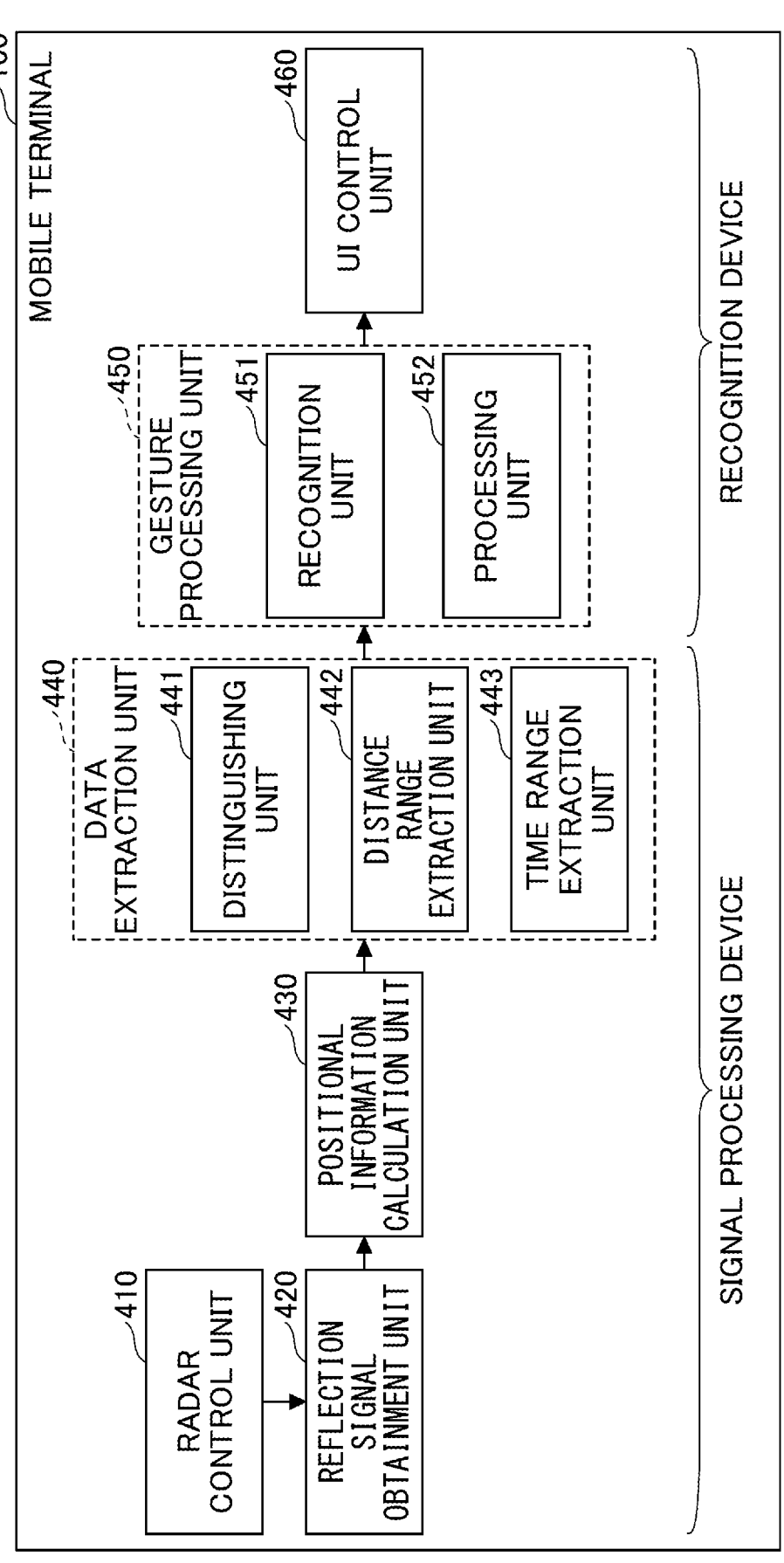
FIG. 4 is a first diagram illustrating an example of a functional configuration of a mobile terminal.

Next, a functional configuration of the mobile terminal 100 will be described. FIG. 4 is a first diagram illustrating an example of a functional configuration of the mobile terminal. As described above, the signal processing program and the gesture recognition program are installed in the mobile terminal 100. The mobile terminal 100 functions as a radar control unit 410, a reflection signal obtainment unit 420, a positional information calculation unit 430, and a data extraction unit 440, when the signal processing program is being executed. Note that these units are functions implemented on the signal processing device. In addition, the mobile terminal 100 functions as a gesture processing unit 450 and a UI control unit 460, when the gesture recognition program is being executed. Note that these units are functions implemented on the recognition device.

The radar control unit 410 controls operations of the radar device 210 so as to cause the radar device 210 to transmit radio signals in predetermined periods and receive reflection waves from an object moving for a gesture.

The reflection signal obtainment unit 420 obtains the reflection signals generated by the radar device 210 receiving the reflection waves from the object moving for the gesture, in the predetermined periods.

The positional information calculation unit 430 is an example of an obtainment unit, and calculates positional information indicating a position of an object moving for a gesture in the three dimensional space at the respective times, based on reflection signals obtained by the reflection signal obtainment unit 420. In addition, the positional information calculation unit 430 obtains positional information on a moving object at the respective times from the calculated positional information at the respective times.

Specifically, the positional information calculation unit 430 obtains positional information having a difference from adjacent positional information greater than or equal to a threshold value as the positional information on the moving object at the respective times, and informs the data extraction unit 440 of the positional information.

The data extraction unit 440 further includes a distinguishing unit 441, a distance range extraction unit 442, and a time range extraction unit 443. The distinguishing unit 441 is an example of an identifying unit and an extraction unit, and identifies a z-coordinate that satisfies the end condition of a gesture (a z-coordinate when the user 110 performs a movement of withdrawing the hand from the space in front of the mobile terminal) from among the positional information at the respective times informed by the positional information calculation unit 430. In addition, the distinguishing unit 441 extracts a group of consecutive z-coordinates including the coordinate identified as the endpoint.

Note that the group of consecutive z-coordinates refers to a collection of consecutive z-coordinates in a time range while the user 110 holds out the hand, performs a gesture, and then, withdraws the hand. The distinguishing unit 441 may extract a group of multiple consecutive z-coordinates or may extract only one coordinate from among the positional information at the respective times, that have been informed from the positional information calculation unit 430.

The distance range extraction unit 442 extracts a minimum z-coordinate from among the group of consecutive z-coordinates extracted by the distinguishing unit 441. In addition, the distance range extraction unit 442 deletes, from among the group of consecutive z-coordinates extracted by the distinguishing unit 441, z-coordinates each having a difference from the minimum z-coordinate that exceeds a predetermined distance range, and informs the time range extraction unit 443 of the group of consecutive z-coordinates after deletion.

The time range extraction unit 443 extracts coordinates included in a predetermined time range from among the group of consecutive z-coordinates after deletion informed by the distance range extraction unit 442. Specifically, the time range extraction unit 443 extracts z-coordinates excluding z-coordinates corresponding to an early time of p % in the first half and z-coordinates corresponding to a late time of q % in the second half from among the group of consecutive z-coordinates after deletion (values of p and q are set discretionarily).

As described above, the user 110 performs a gesture after holding out the hand. Therefore, among the group of consecutive z-coordinates after deletion, in an early time in the first half, a movement of holding out the hand appears. In addition, the user 110 withdraws the hand after performing the gesture. Therefore, among the group of consecutive z-coordinates after deletion, in a late time in the second half, a movement of withdrawing the hand appears. In the time range extraction unit 443, focusing on such events, z-coordinates in an early time in the first half and z-coordinates in a late time in the second half included in the group of consecutive z-coordinates after deletion are treated as noise.

In addition, the time range extraction unit 443 outputs positional information (x-coordinate, y-coordinate, and z-coordinate) corresponding to the z-coordinate extracted from among the group of consecutive z-coordinates after deletion as a group of positional information for recognition.

The gesture processing unit 450 further includes a recognition unit 451 and a processing unit 452. The recognition unit 451 recognizes a gesture, based on the group of positional information for recognition output from the time range extraction unit 443. In addition, the recognition unit 451 informs the processing unit 452 of a recognition result.

The processing unit 452 executes processing corresponding to the recognition result informed by the recognition unit 451. For example, in the case where a predetermined character is informed as the recognition result, the processing unit 452 informs the UI control unit 460 of the character so as to have the informed character displayed on the user interface device 205. Alternatively, in the case where a predetermined operation command is informed as the recognition result, the processing unit 452 informs the UI control unit 460 of the operation command so as to cause the user interface device 205 to execute an operation (e.g., voice output) corresponding to the informed operation command.

The UI control unit 460 controls the user interface device 205 in response to the information from the processing unit 452.

<Flow of Processing by Positional Information Calculation Unit>

Figure 5:
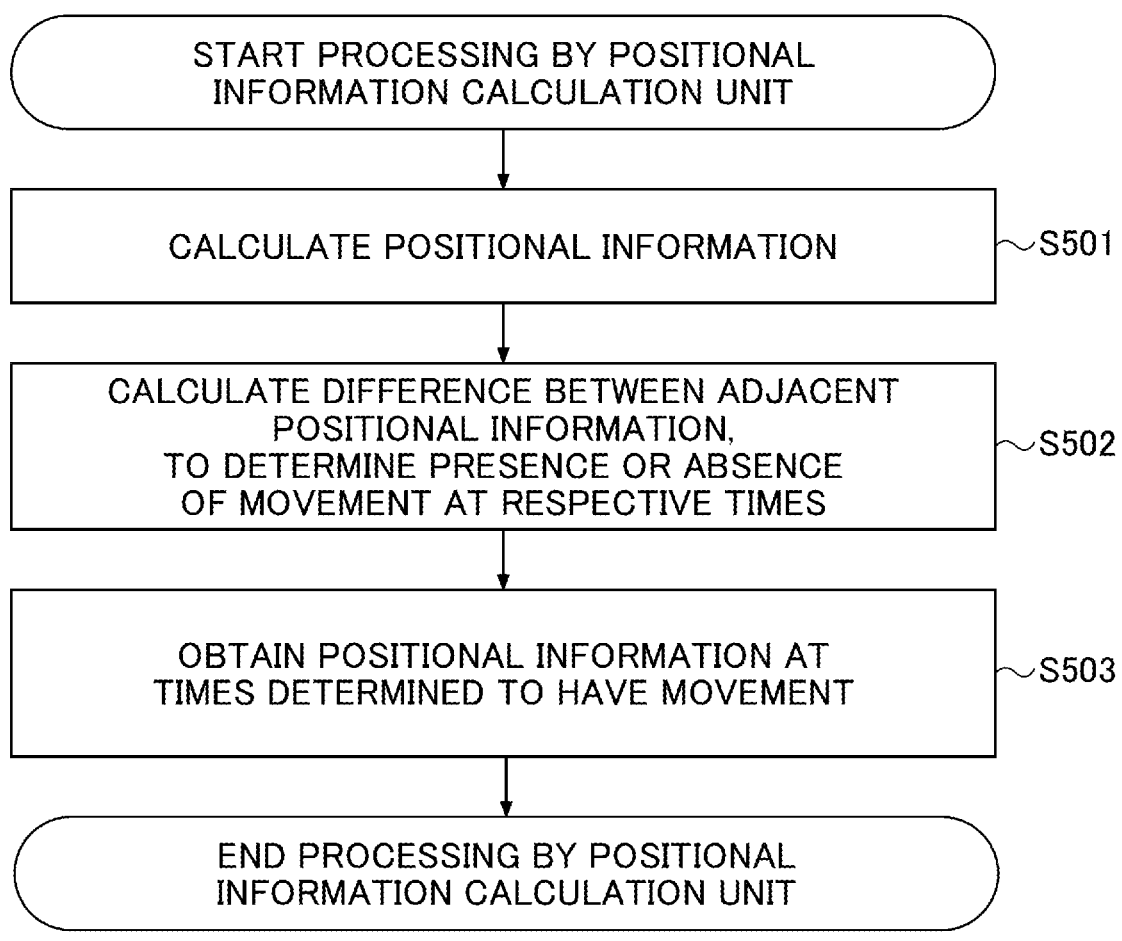
FIG. 5 is a flow chart illustrating a flow of processing by a positional information calculation unit.

Next, a flow of processing executed by the positional information calculation unit 430 will be described with reference to FIGS. 5 and 6. FIG. 5 is a flow chart illustrating a flow of processing by the positional information calculation unit. FIG. 6 is a diagram illustrating an example of information used in the positional information calculation unit.

At Step S501, the positional information calculation unit 430 calculates positional information indicating a position of the hand of the user 110 in the three dimensional space at the respective times based on the reflection signals. As illustrated in FIG. 6, the positional information 600 includes "time" and "coordinate data" as items of information.

A time elapsed since transmission of a radio signal by the radar device 210 is stored in the "time" in predetermined periods.

The "coordinate data" stores the x coordinate, the y coordinate, and the z-coordinate indicating the position of the hand of the user 110 in the three dimensional space at the respective times that are calculated based on the signal of the reflection wave received by the radar device 210.

At Step S502, the positional information calculation unit 430 calculates a difference between adjacent positional information items, to generate determination information for determining presence or absence of a movement of the hand of the user 110 at the respective times. As illustrated in FIG. 6, the determination information 610 includes "time", "adjacent difference data", and "movement" as items of information.

A time elapsed since transmission of a radio signal by the radar device 210 is stored in the "time" in predetermined periods. A calculation result obtained by calculating the difference between adjacent positional information is stored in the "adjacent difference data". In the "movement", in the case where the calculation result stored in the "adjacent difference data" is greater than or equal to a threshold value, it is determined that there is a movement, and for example, a mark "○" is stored. On the other hand, in the case where the calculation result stored in the "adjacent difference data" is less than the threshold value, it is determined that there is no movement, and for example, a mark "-" is stored.

At Step S503, the positional information calculation unit 430 obtains the positional information at a time at which it is determined that there is a movement. As illustrated in FIG. 6, the positional information 620 on the hand of the user 110 that is determined to be moving at respective times includes "time" and "coordinate data" as items of information.

A time at which the positional information calculation unit 430 determines that there is a movement is stored in the "time", among the times elapsed since the start of transmission of radio signals by the radar device 210. The positional information at the time when the positional information calculation unit 430 determines that there is a movement is stored in the "coordinate data".

<Flow of Processing by Distinguishing Unit>

Figure 7:
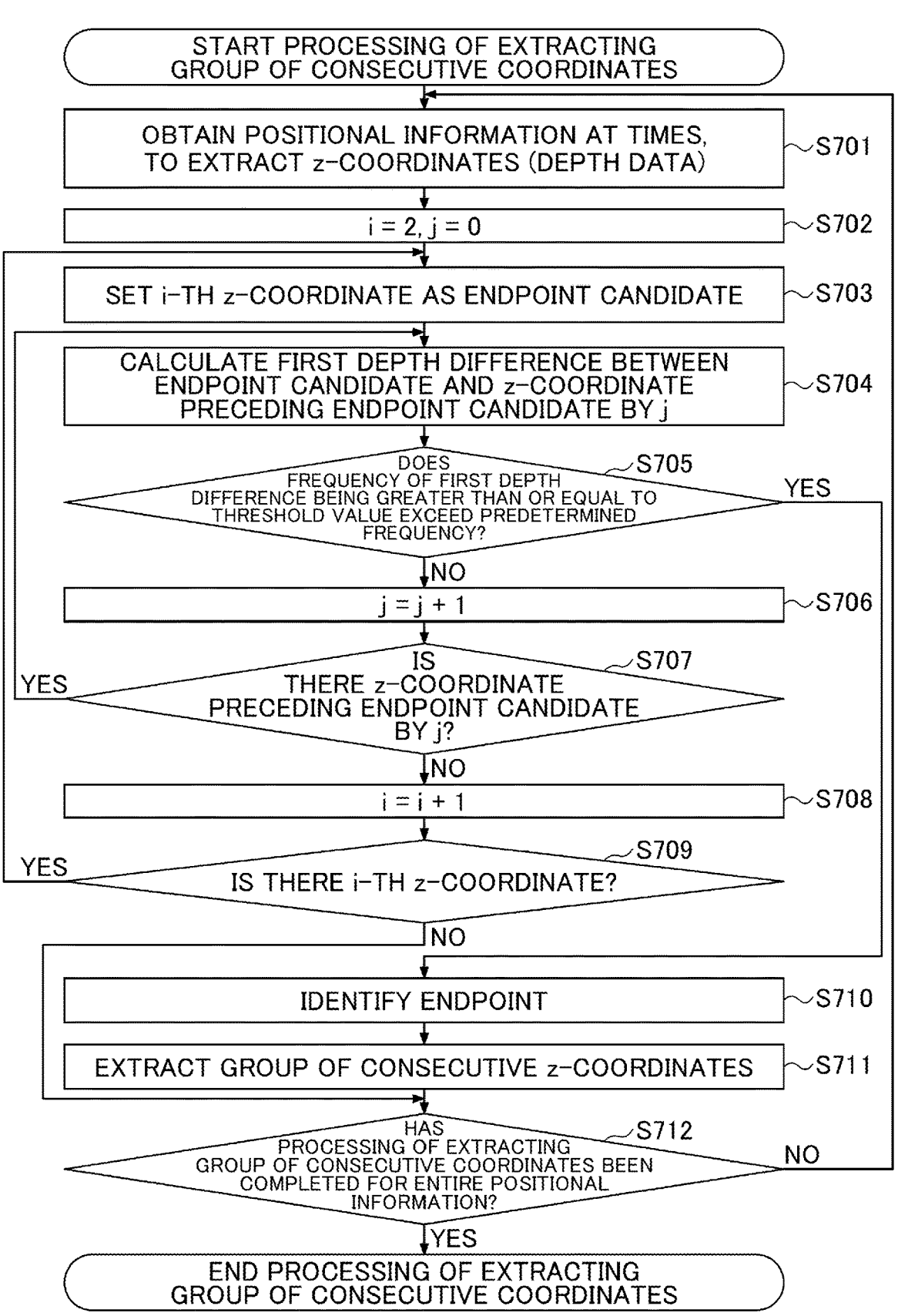
FIG. 7 is a flow chart illustrating a flow of processing by a distinguishing unit.

Next, a flow of processing executed by the distinguishing unit 441 will be described with reference to FIGS. 7 and 8. FIG. 7 is a flow chart illustrating a flow of processing by the distinguishing unit, and is a flow chart illustrating a flow of processing to extract a group of consecutive coordinates. FIG. 8 is a diagram illustrating an example of information used in the distinguishing unit.

At Step S701, the distinguishing unit 441 obtains the positional information 620 at the respective times of the hand of the user 110 determined to be moving by the positional information calculation unit 430, and extracts the z-coordinates (depth data). As illustrated in FIG. 8, the depth data 710 includes "time" and "z-coordinate" as items of information.

A time at which the positional information calculation unit 430 determines that there is a movement is stored in the "time", among the times elapsed since the start of transmission of radio signals by the radar device 210.

The z-coordinate of the positional information at the time at which the positional information calculation unit 430 determines that there is a movement is stored in the "z-coordinate".

At Step S702, the distinguishing unit 441 inputs "2" to the counter i and inputs "0" to the counter j.

At Step S703, the distinguishing unit 441 sets the i-th z-coordinate among the z-coordinates included in the depth data 710 as an endpoint candidate. In FIG. 8, a reference numeral 810 indicates a state in which the second z-coordinate ("$z_4$") among the z-coordinates included in the depth data 710 is set as an endpoint candidate.

At Step S704, the distinguishing unit 441 calculates a first depth difference as a difference between the endpoint candidate and a z-coordinate preceding the endpoint candidate by j. In FIG. 8, the reference numeral 810 indicates a state in which "$z_4-z_4$" as a difference between the second z-coordinate ("$z_4$") as the endpoint candidate and a z-coordinate preceding the second z-coordinate ("$z_4$") as the endpoint candidate by 0, is calculated as the first depth difference.

At Step S705, the distinguishing unit 441 determines whether or not the frequency (i.e., the number of occurrences) of the first depth difference being greater than or equal to a threshold value exceeds a predetermined frequency. At Step S705, if it is determined that the frequency does not exceed the predetermined frequency (if NO at Step S705), the process proceeds to Step S706. At Step S706, the distinguishing unit 441 increments the counter j.

In FIG. 8, in the case of the reference numeral 810, as the first depth difference 0 items before is less than the threshold value, the process proceeds from Step S705 to Step S706, and the counter j becomes "1".

At Step S707, the distinguishing unit 441 determines whether or not there is a z-coordinate preceding the endpoint candidate by j. At Step S707, if it is determined that there is a z-coordinate preceding the endpoint candidate by j (if YES at Step S707), the process returns to Step S704.

In the case of the reference numeral 810 in FIG. 8, there is a z-coordinate ("$z_4$") preceding the second z-coordinate ("$z_3$") as the endpoint candidate by one, and hence, the process returns to Step S704. In this case, as illustrated in FIG. 8, at Step S704, a difference "$z_4-z_3$" between the second z-coordinate ("$z_4$") as the endpoint candidate and a z-coordinate preceding the second z-coordinate ("$z_4$") as the endpoint candidate by one, is calculated as the first depth difference. Note that in the case of the reference numeral 810 in FIG. 8, the first depth difference in the case of the counter j being "1" is also determined to be less than the threshold value (NO at Step S705), and the counter j becomes "2" (Step S706).

On the other hand, at Step S707, if it is determined that there is no z-coordinate preceding the endpoint candidate by j (if NO at Step S707), the process proceeds to Step S708. At Step S708, the distinguishing unit 441 increments the counter i. In addition, the distinguishing unit 441 resets the counter j to "0".

In the case of the reference numeral 810 in FIG. 8, at Step S707, the counter i is "2" and it is determined that there is no z-coordinate preceding the second z-coordinate ("$z_4$") as the endpoint candidate by two; therefore, at Step S708, the counter i becomes "3" and the counter j is reset to "0".

At Step S709, the distinguishing unit 441 determines whether or not there is an i-th z-coordinate (consecutive z-coordinate). If it is determined at Step S709 that there is the i-th z-coordinate (if YES at Step S709), the process returns to Step S703.

In the case of the reference numeral 810 in FIG. 8, there is a third z-coordinate ("$z_5$") as a consecutive z-coordinate, and hence, the process returns to Step S703.

In this way, the distinguishing unit 441 repeats the processing from Step S703 to Step S709 as described above while incrementing the value of the counter i in order. If it is determined that the frequency of the first depth difference being greater than or equal to the predetermined value exceeds the predetermined frequency at Step S705 while repeating this processing (if YES at Step S705), it is determined that the gesture of the user 110 has ended, and the process proceeds to Step S710.

On the other hand, at Step S709, if it is determined that there is no i-th z-coordinate (if NO at Step S709), the process proceeds to Step S712.

In FIG. 8, a reference numeral 820 indicates a case where the counter i is "13" (i.e., the thirteenth z-coordinate ("$z_{15}$") is determined as the endpoint candidate), and it is determined that the frequency of the first depth difference being greater than or equal to the threshold value exceeds the predetermined frequency.

At Step S710, the distinguishing unit 441 identifies, as the endpoint, an endpoint candidate obtained when it is determined that the frequency of the first depth difference being greater than or equal to the threshold value exceeds the predetermined frequency. In FIG. 8, the reference numeral 820 indicates a state in which the thirteenth z-coordinate ("$z_{15}$") is identified as the end point.

At Step S711, the distinguishing unit 441 extracts a group of consecutive z-coordinates. Specifically, the distinguishing unit 441 extracts a group of consecutive z-coordinates including the identified z-coordinate at Step S710 as the endpoint.

In the case of the reference numeral 820 in FIG. 8, z-coordinates ranging from the z-coordinate="$z_3$" at the time="$t_3$" to the z-coordinate="$z_{15}$" at the time="$t_{15}$" are extracted as a group of consecutive z-coordinates 830. As illustrated in FIG. 8, the extracted group of consecutive z-coordinates 830 include "time", "data number n", "depth data", and "first depth difference" as items of information.

Among the times elapsed since the start of transmission of radio signals by the radar device 210, times at which the positional information calculation unit 430 determines that there is a movement and respective times up to the endpoint identified by the distinguishing unit 441 are stored in the "time".

Numbers assigned in a time sequence to the z-coordinates extracted at Step S711 are stored in the items of "data number n".

A specific numerical value of the z-coordinate extracted at Step S711 is stored in the "depth data".

A specific numerical value of the difference between the z-coordinate of the endpoint identified at Step S710 and the z-coordinate extracted at Step S711 is stored in the "first depth difference".

Note that if it is determined at Step S709 that there is no i-th z-coordinate, it is a case of determination that there is no next z-coordinate even though the end point is not identified, and the distinguishing unit 441 determines that the gesture of the user 110 has not ended. In this case, the process proceeds to Step S712, without extracting the group of consecutive z-coordinates by the distinguishing unit 441.

At Step S712, the distinguishing unit 441 determines whether or not the processing for extracting a group of consecutive coordinates has been completed for the entire positional information at the respective times of the hand of the user 110 determined to be moving that has been informed by the positional information calculation unit 430.

At Step S712, if it is determined that there is positional information for which the processing for extracting a group of consecutive coordinates has not been completed (if NO at Step S712), the process returns to Step S701. On the other hand, at Step S712, if it is determined that the processing for extracting a group of consecutive coordinates has been completed for the entire positional information on the hand of the user 110 at the respective times for which it is determined that there is a movement (if YES at Step S712), the processing ends.

Note that in the description described above, a case has been described in which the positional information 620 of the hand of the user 110 determined to be moving at the respective times is obtained based on the adjacent difference data from the time="$t_1$" to the time="$t_{17}$" in the determination information 610.

On the other hand, it may also be assumed that the positional information on the hand of the user 110 determined to be moving at the respective times is obtained based on the adjacent difference data at the respective times after the time="$t_{17}$". In this case, at Step S712, it is determined that there is positional information for which the processing for extracting a group of consecutive coordinates has not been completed, and the distinguishing unit 441 returns to Step S701.

In contrast, if the positional information on the hand of the user 110 determined to be moving based on the adjacent difference data at the respective times after the time="$t_{17}$" is not obtained at the respective times, the processing ends as described above.

<Flow of Processing by Distance Range Extraction Unit>

Figure 9:
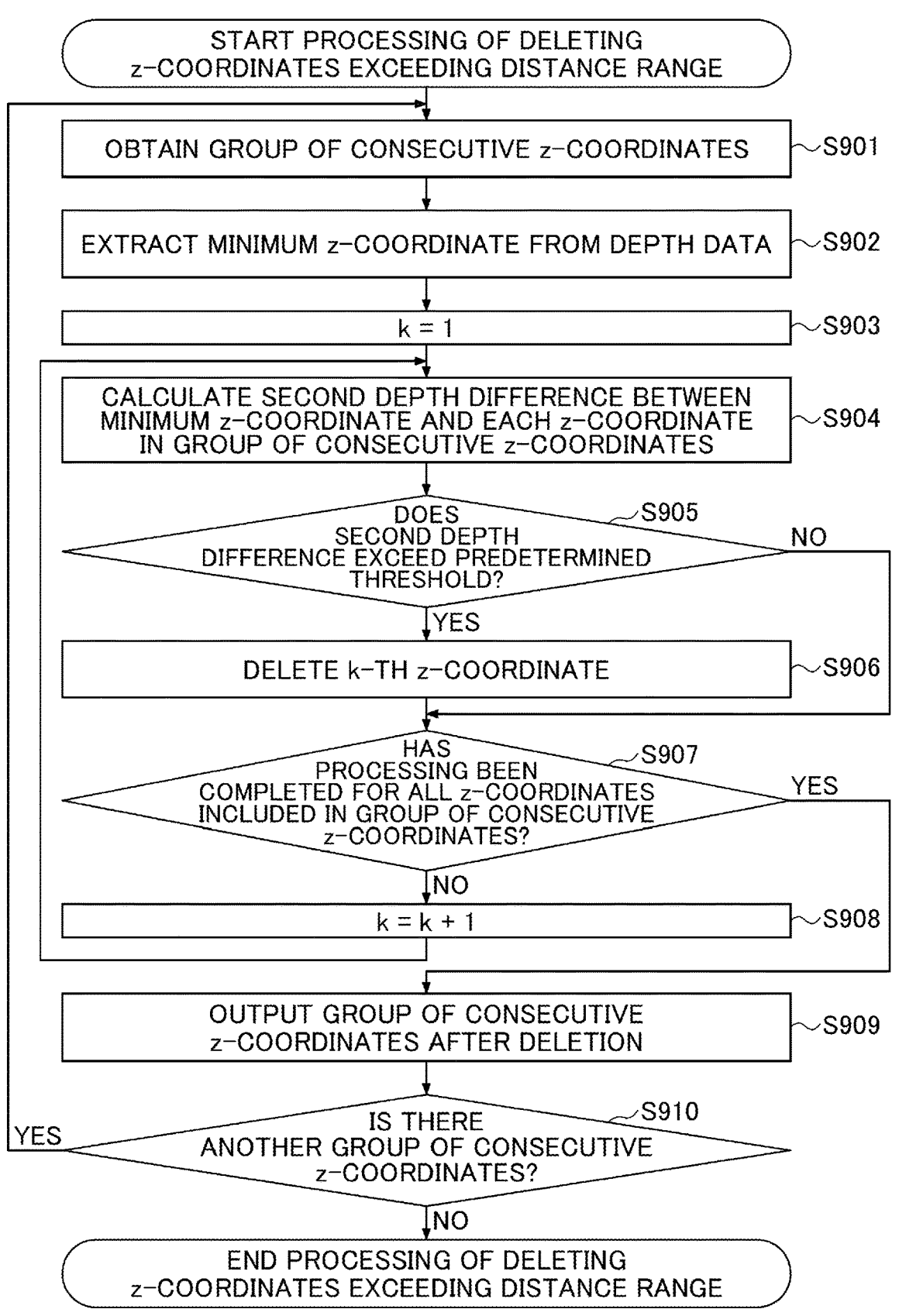
FIG. 9 is a flow chart illustrating a flow of processing by a distance range extraction unit.

Next, a flow of processing executed by the distance range extraction unit 442 will be described with reference to FIGS. 9 and 10. FIG. 9 is a flow chart illustrating a flow of processing by the distance range extraction unit, and is a flow chart illustrating a flow of processing for deleting z-coordinates exceeding the distance range. FIG. 10 is a diagram illustrating an example of information used in the distance range extraction unit.

At Step S901, the distance range extraction unit 442 obtains the group of consecutive z-coordinates 830 from the distinguishing unit 441. In FIG. 10, the group of consecutive z-coordinates 830 indicate the group of consecutive z-coordinates obtained from the distinguishing unit 441.

At Step S902, the distance range extraction unit 442 extracts a minimum z-coordinate (depth data) from the obtained group of consecutive z-coordinates 830. In the group of consecutive z-coordinates 830 in FIG. 10, a z-coordinate surrounded by a thick frame indicates the minimum z-coordinate.

At Step S903, the distance range extraction unit 442 substitutes "1" for the counter k.

At Step S904, the distance range extraction unit 442 calculates a difference between the extracted minimum z-coordinate and a k-th z-coordinate included in the group of consecutive z-coordinates 830 (referred to as the second depth difference).

In FIG. 10, the group of consecutive z-coordinates 1010 indicates a state in which the second depth difference is calculated. As illustrated in FIG. 10, the group of consecutive z-coordinates 1010 includes "data number n", "depth data", and "second depth difference" as items of information.

Among these, the "data number n" and the "depth data" are the same as the "data number n" and the "depth data" of the group of consecutive z-coordinates 830, and hence, the description is omitted here. On the other hand, in the "second depth difference", differences between the depth data of the data number n="5" (z-coordinate="12") as the minimum z-coordinate and the depth data of the data number n="0" to "12" (z-coordinate="60", "50" . . . , "150") are stored.

At Step S905, the distance range extraction unit 442 determines whether or not the second depth difference exceeds a predetermined threshold value. At Step S905, if it is determined that the second depth difference exceeds the predetermined threshold value (if YES at Step S905), the process proceeds to Step S906.

At Step S906, the distance range extraction unit 442 deletes the k-th z-coordinate (depth data), and the process proceeds to Step S907.

On the other hand, at Step S905, if it is determined that the second depth difference does not exceed the predetermined threshold value (if NO at Step S905), the process proceeds to Step S907 directly.

At Step S907, the distance range extraction unit 442 determines whether or not the processing from Step S904 to Step S906 has been completed for the entire depth data included in the group of consecutive z-coordinates 1010.

At Step S907, if it is determined that the process is not completed (if NO at Step S907), the process proceeds to Step S908.

At Step S908, the distance range extraction unit 442 increments the counter k and returns to Step S904.

Thereafter, the distance range extraction unit 442 repeats the processing from Step S904 to Step S908 until the processing is completed for the entire depth data included in the group of consecutive z-coordinates 1010. If it is determined at Step S907 that the processing is completed while repeating the processing (if YES at Step S907), the process proceeds to Step S909.

Note that in the case of the group of consecutive z-coordinates 1010 in FIG. 10, the threshold value is "15", and hence, the depth data of "0", "1", and "9" to "12" are deleted by the processing up to this stage.

At Step S909, the distance range extraction unit 442 outputs a group of consecutive z-coordinates after deletion 1020. In FIG. 10, the group of consecutive z-coordinates after deletion 1020 indicate a state in which the z-coordinate (depth) having the second depth difference exceeding "15" is deleted from the group of consecutive z-coordinates 1010. As illustrated in FIG. 10, the group of consecutive z-coordinates after deletion 1020 includes "data number n", "depth data", and "second depth difference" as items of information.

At Step S910, the distance range extraction unit 442 determines whether or not there is another group of consecutive z-coordinates. At Step S910, if it is determined that there is another group of consecutive z-coordinates (if YES at Step S910), the process returns to Step S901. Thereafter, the distance range extraction unit 442 executes the processing from Step S901 to Step S909 for the other group of consecutive z-coordinates.

On the other hand, at Step S909, if it is determined that there is no other group of consecutive z-coordinates (if NO at Step S910), the processing of deleting the z-coordinate exceeding the distance range ends.

<Flow of Time Range Extraction Processing>

Figure 11:
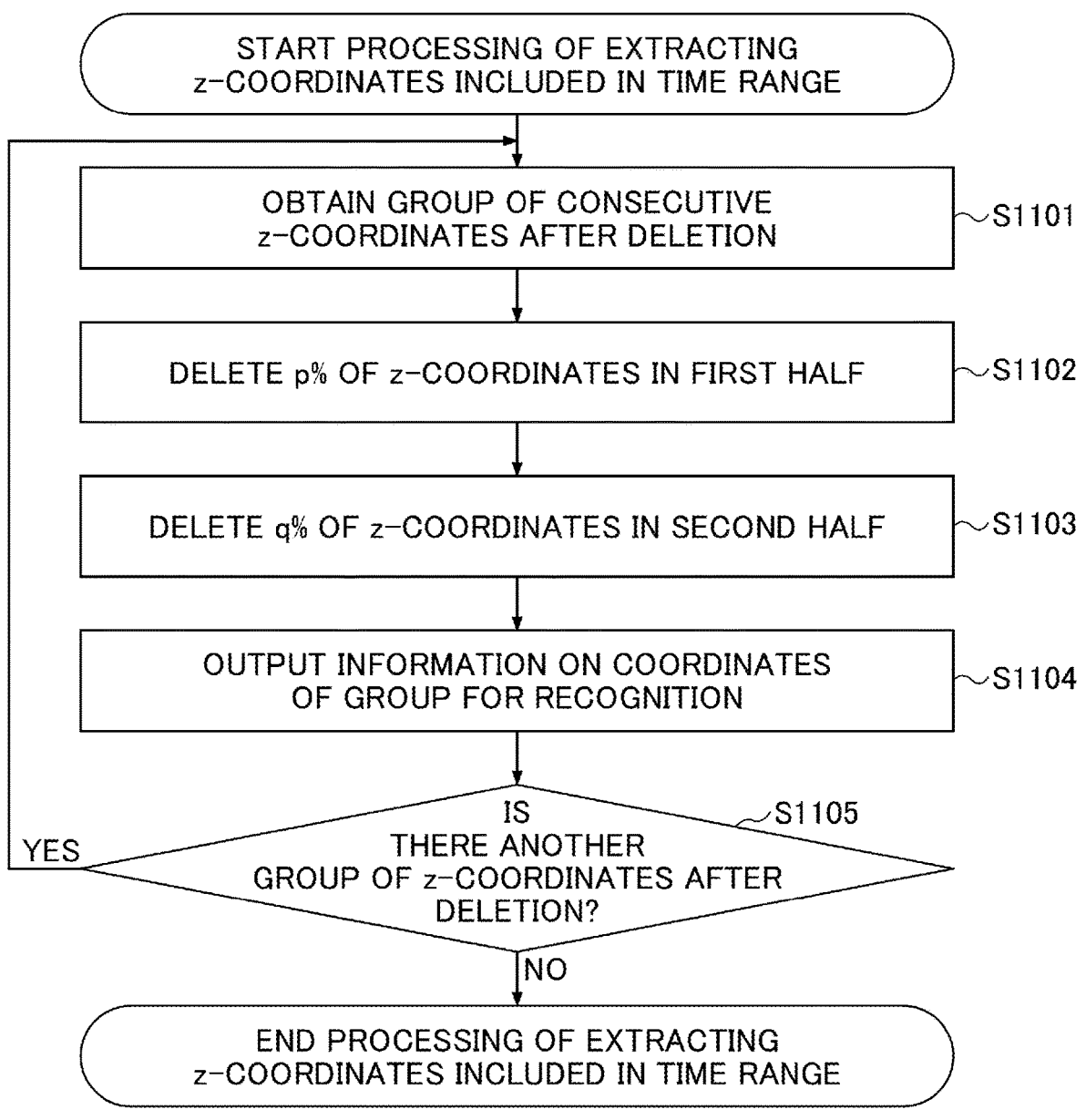
FIG. 11 is a flow chart illustrating a flow of processing by a time range extraction unit.

Next, a flow of processing executed by the time range extraction unit 443 will be described with reference to FIGS. 11 and 12. FIG. 11 is a flow chart illustrating a flow of processing by the time range extraction unit, and is a flow chart illustrating a flow of processing to extract z-coordinates included in the time range. FIG. 12 is a diagram illustrating an example of information used in the time range extraction unit.

At Step S1101, the time range extraction unit 443 obtains the group of consecutive z-coordinates after deletion 1020 from the distance range extraction unit 442. In FIG. 12, the group of consecutive z-coordinates after deletion 1020 indicates the group of consecutive z-coordinates after deletion obtained from the distance range extraction unit 442.

At Step S1102, the time range extraction unit 443 deletes z-coordinates in an early time of p % in the first half that are obtained from the distance range extraction unit 442, among the z-coordinates at the respective times (respective data numbers) included in the group of consecutive z-coordinates after deletion 1020.

At Step S1103, the time range extraction unit 443 deletes z-coordinates in a late time of q % in the second half that are obtained from the distance range extraction unit 442, among the z-coordinates at the respective times (respective data numbers) included in the group of consecutive z-coordinates after deletion 1020.

In FIG. 12, the group of consecutive z-coordinates after deletion 1210 indicates a state in which a z-coordinate of the data number $n=$"2" is identified at Step S1102 as a z-coordinate in an early time of 20% ($p=20$) in the first half. In addition, in FIG. 12, the group of consecutive z-coordinates after deletion 1210 indicates a state in which a z-coordinate of the data number $n=$"8" is identified at Step S1103 as a z-coordinate in a late time of 20% ($q=20$) in the second half.

In addition, in FIG. 12, z-coordinates 1220 included in the time range indicate a state in which the z-coordinate of the data number $n=$"2" and the z-coordinate of the data number="8" are deleted from the group of consecutive z-coordinates after deletion 1210, and only the z-coordinates included in the time range are extracted.

At Step S1104, the time range extraction unit 443 outputs positional information corresponding to the z-coordinates included in the time range (range of 20% to 80%) as the group of positional information for recognition 1230.

As illustrated in FIG. 12, the group of positional information for recognition 1230 includes "time" and "coordinate data" as items of information.

A time corresponding to the data number n in the z-coordinates 1220 included in the time range is stored in the "time". Coordinate data corresponding to the time is stored in the "coordinate data".

At Step S1105, the time range extraction unit 443 determines whether or not there is another group of consecutive z-coordinates after deletion. At Step S1105, if it is determined that there is another group of consecutive z-coordinates after deletion (if YES at Step S1105), the process returns to Step S1101. Thereafter, the time range extraction unit 443 executes the processing from Step S1101 to Step S1104 for the other group of consecutive z-coordinates after deletion.

On the other hand, at Step S1105, if it is determined that there is no other group of consecutive z-coordinates after deletion (if NO at Step S1105), the processing of extracting z-coordinates included in the time range ends.

Example of Recognized Gesture

Figure 13:
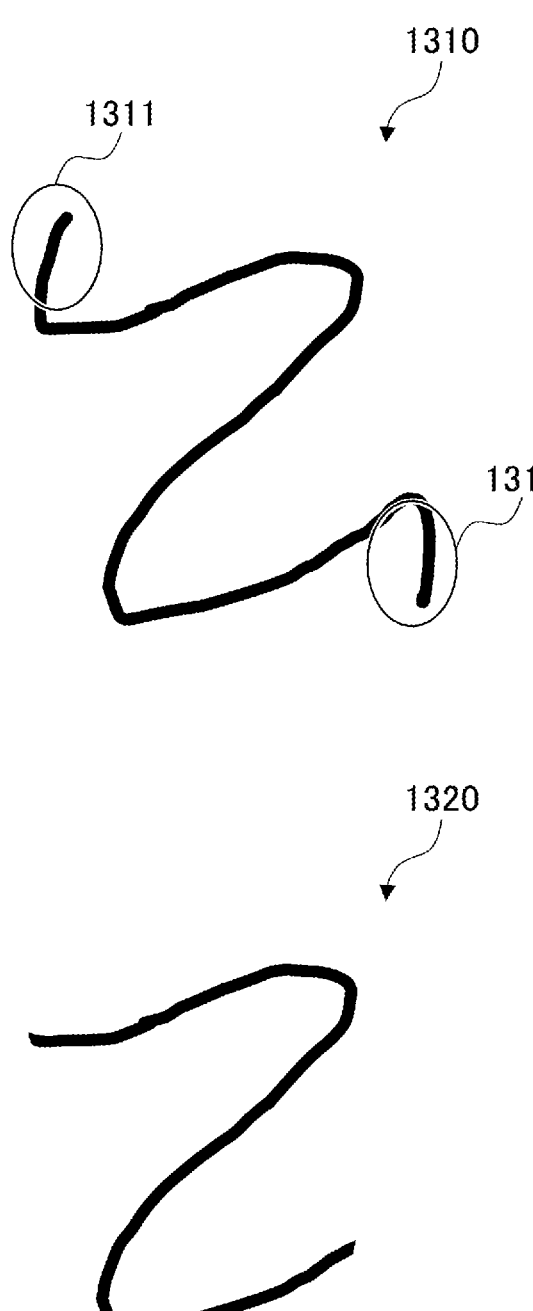
FIG. 13 is a diagram illustrating an example of a gesture recognized based on a group of positional information for recognition.

Next, a specific example of a gesture recognized by the recognition unit 451 based on a group of positional information for recognition 1230 will be described. FIG. 13 is a diagram illustrating an example of a gesture recognized based on a group of positional information for recognition.

As described above, in the group of positional information for recognition 1230, z-coordinates in the time range corresponding to 20% of the first and second halves are deleted by the time range extraction unit 443. On the other hand, if the time range corresponding to 20% of the first and second halves is not deleted by the time range extraction unit 443, areas 1311 and 1312 are included as shown in a reference numeral 1310. In contrast, by having the time range corresponding to 20% of the first and second halves deleted by the time range extraction unit 443, the areas 1311 and 1312 are not included as shown in a reference numeral 1320.

Accordingly, the recognition unit 451 can recognize a gesture based on the reference numeral 1320, and can recognize an alphabetic letter "z" more correctly.

Conclusion

As is clear from the above description, the signal processing device included in the mobile terminal 100 in the first embodiment is configured to:

be connected to the radar device 210 that transmits radio signals in predetermined periods and receives reflection waves, to process signals of the reflection waves;

include the positional information calculation unit 430 that obtains positional information on the hand of the user 110 at the respective times, the hand being determined to be moving, based on the signals of the reflection waves; and include the distinguishing unit 441 that identifies a z-coordinate that satisfies the end condition of a gesture, the z-coordinate being a z-axis coordinate (z-coordinate) indicating the transmission direction of radio signals, and extracts a group of consecutive z-coordinates having the identified z-coordinate as an end point.

In this way, by adopting a configuration in which the signal processing device deletes reflection signals that are not necessary for recognizing a gesture by signal processing, the recognition accuracy of the gesture can be improved on the mobile terminal 100.

Second Embodiment

In the first embodiment described above, a predetermined distance from the mobile terminal 100 is set as the detection range. In contrast, in a second embodiment, the position of the trunk of the user 110 is detected, and the detection range is calculated based on the detected position of the trunk. Accordingly, the positional information on the trunk is prevented from being erroneously included in the group of positional information for recognition, and the recognition accuracy of a gesture can be further improved. In the following, the second embodiment will be described focusing on differences from the first embodiment described above.

Use Example of Gesture Recognition System

Figure 14:
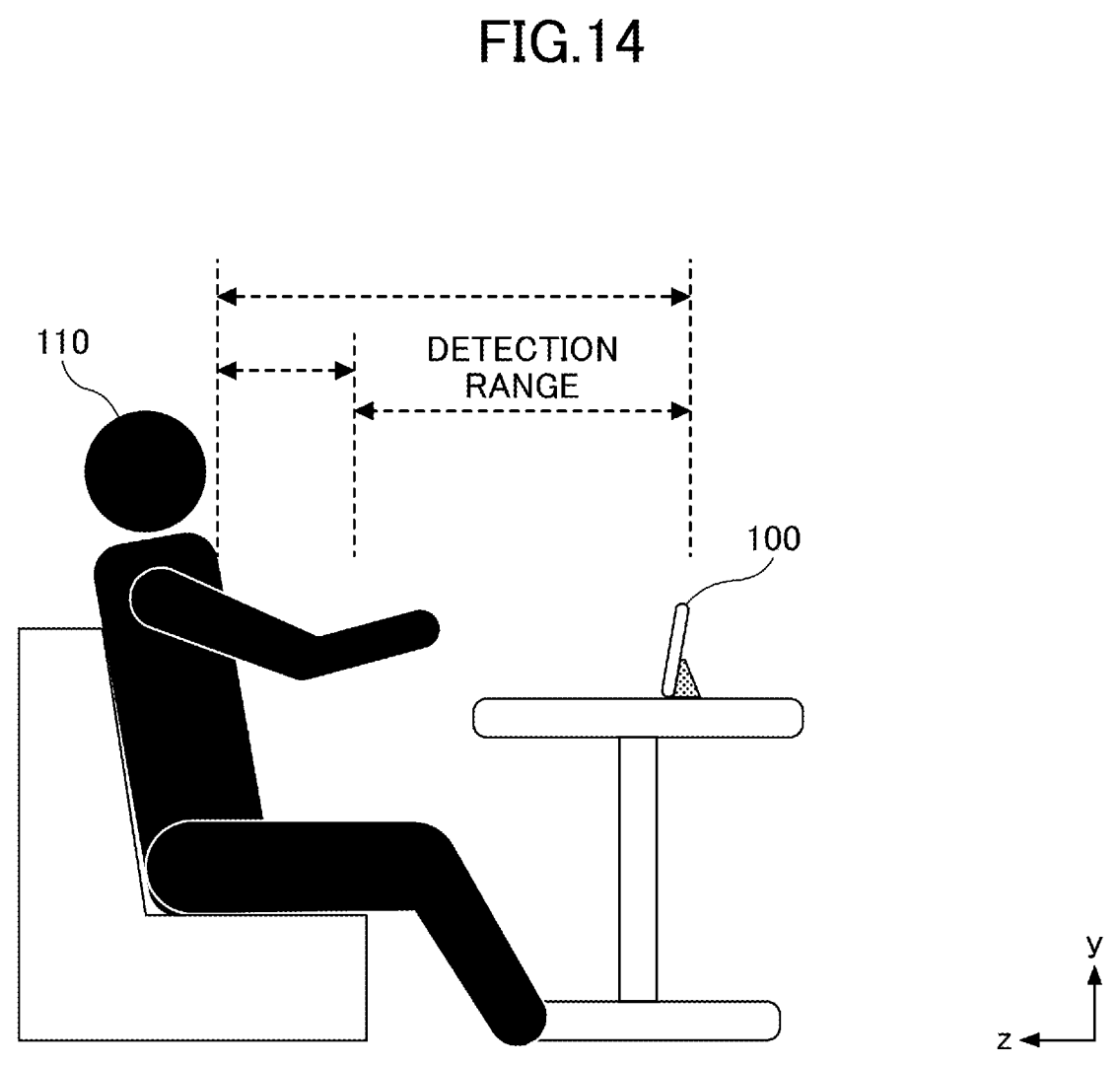

First, an example of use of a gesture recognition system in the second embodiment will be described. FIG. 14 is a second diagram illustrating an example of use of a gesture recognition system. A difference from FIG. 1 is that in the case of FIG. 14, the mobile terminal 100 detects not only the hand (a first object) of the user 110, but also the position of the trunk (a second object) of the user 110. In addition, another difference from FIG. 1 in the case of FIG. 14 is that, in the case where the user 110 makes a gesture using the hand, in view of a gesture being made generally in a state of extending his/her arm to a position away from the trunk by a certain distance, the detection range is set to be a range from a position away from the detected position of the trunk of the user 110 by a predetermined distance in the direction of the mobile terminal 100 (radar device 210) to the mobile terminal 100 (radar device 210).

In this way, by adopting a configuration that detects the position of the trunk of the user 110, it is possible to avoid the positional information on the trunk from being included in the group of positional information for recognition. As a result, according to the second embodiment, the recognition accuracy of a gesture can be further improved.

Note that in the present embodiment, the radar device 210 of the mobile terminal 100 transmits radio signals for detecting the position of the trunk of the user 110, in addition to radio signals for calculating the positional information on the hand of the user 110. Accordingly, in the second embodiment, the mobile terminal 100 can detect the trunk of the user 110 in addition to the hand of the user 110.

<Functional Configuration of Mobile Terminal>

Figure 15:
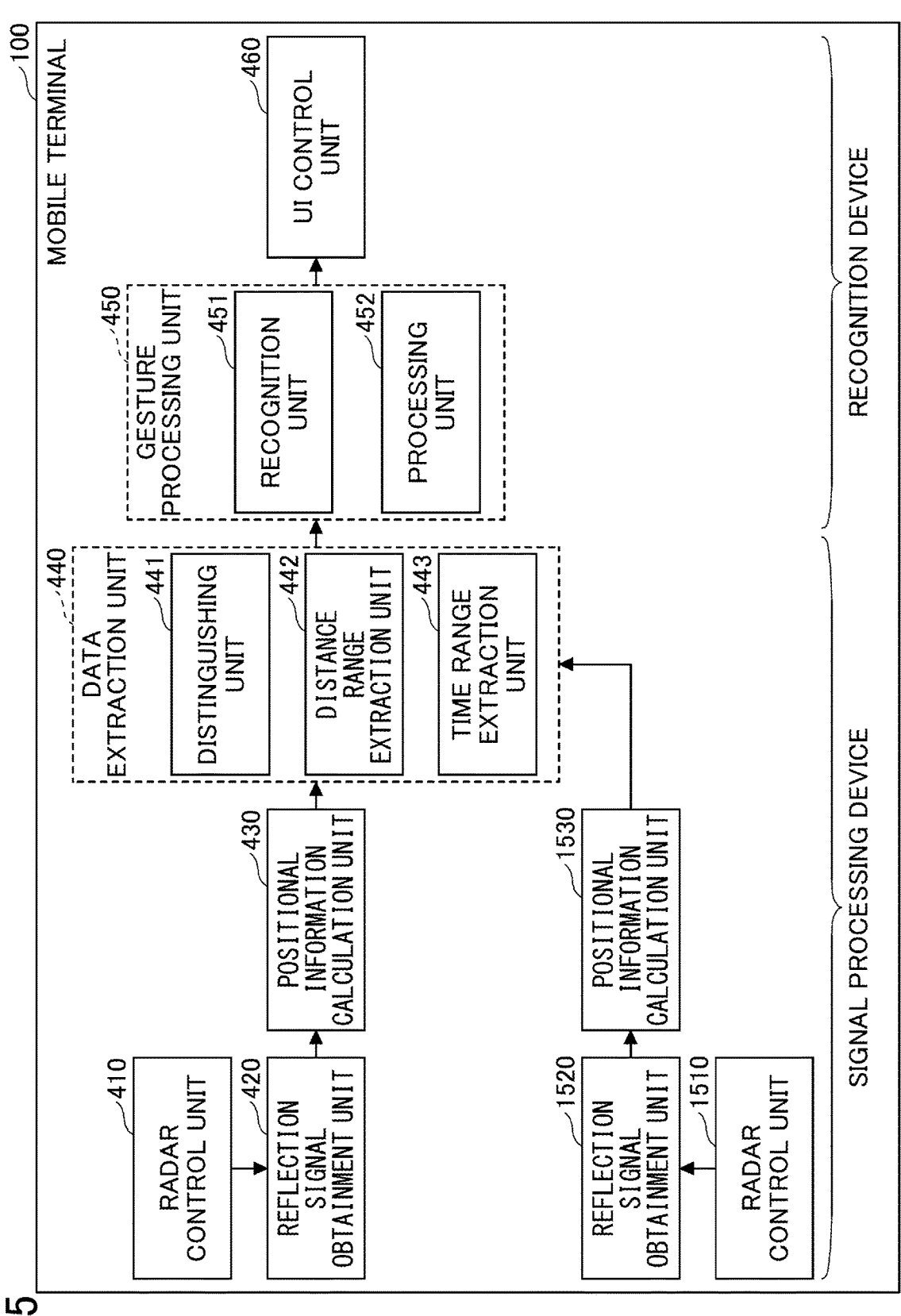
FIG. 15 is a second diagram illustrating an example of a functional configuration of a mobile terminal.

Next, a functional configuration of the mobile terminal 100 in the second embodiment will be described. FIG. 15 is a second diagram illustrating an example of a functional configuration of the mobile terminal. A difference from the functional configuration of the mobile terminal 100 in the first embodiment described using FIG. 4 is that the second embodiment includes a radar control unit 1510, a reflection signal obtainment unit 1520, and a positional information calculation unit 1530.

The radar control unit 1510 controls operations of the radar device 210 so as to cause the radar device 210 to transmit radio signals in predetermined periods and receive reflection waves from the trunk of the user 110; specifically, the radar control unit 1510 is configured to:

control the radar device 210 so as to transmit a radio signal (a second radio wave) in a period longer than a period in which the radar control unit 410 controls the radar device 210 to transmit a radio signal (a first radio wave) (e.g., 2× transmission period); and control the radar device 210 so as to transmit a radio signal with an occupied bandwidth narrower than the occupied bandwidth of a radio signal with which the radar control unit 410 controls the radar device 210 to transmit.

The reflection signal obtainment unit 1520 obtains reflection signals generated by the radar device 210 receiving reflection waves from the trunk of the user 110 in predetermined periods; specifically, the reflection signal obtainment unit 1520 is configured to:

obtain a reflection signal from a receiver different from a receiver from which the reflection signal obtainment unit 420 obtains a reflection signal; and obtain a reflection signal in a period longer than a period in which the reflection signal obtainment unit 420 obtains a reflection signal (e.g., 2X transmission period).

The positional information calculation unit 1530 calculates positional information indicating the position of the trunk of the user 110 in the three dimensional space at the respective times, based on the reflection signals obtained by the reflection signal obtainment unit 1520. In addition, the positional information calculation unit 1530 informs the data extraction unit 440 of the calculated positional information in the predetermined periods.

Accordingly, the data extraction unit 440 can obtain the positional information on the hand of the user 110 at the respective times and the positional information on the trunk of the user 110 at the respective times in a distinguishable way based on the positional information informed by the positional information calculation unit 1530.

In addition, based on the positional information on the trunk of the user 110 at the respective times, the data extraction unit 440 can set a detection range by setting a range not to be detected with reference to the position of the trunk of the user 110. Accordingly, the positional information calculation unit 430 can identify positional information to be deleted as data not to be detected when obtaining positional information on the hand of the user 110 at the respective times.

Specific Example of Radio Signals Transmitted from Radar Device

Figure 16:
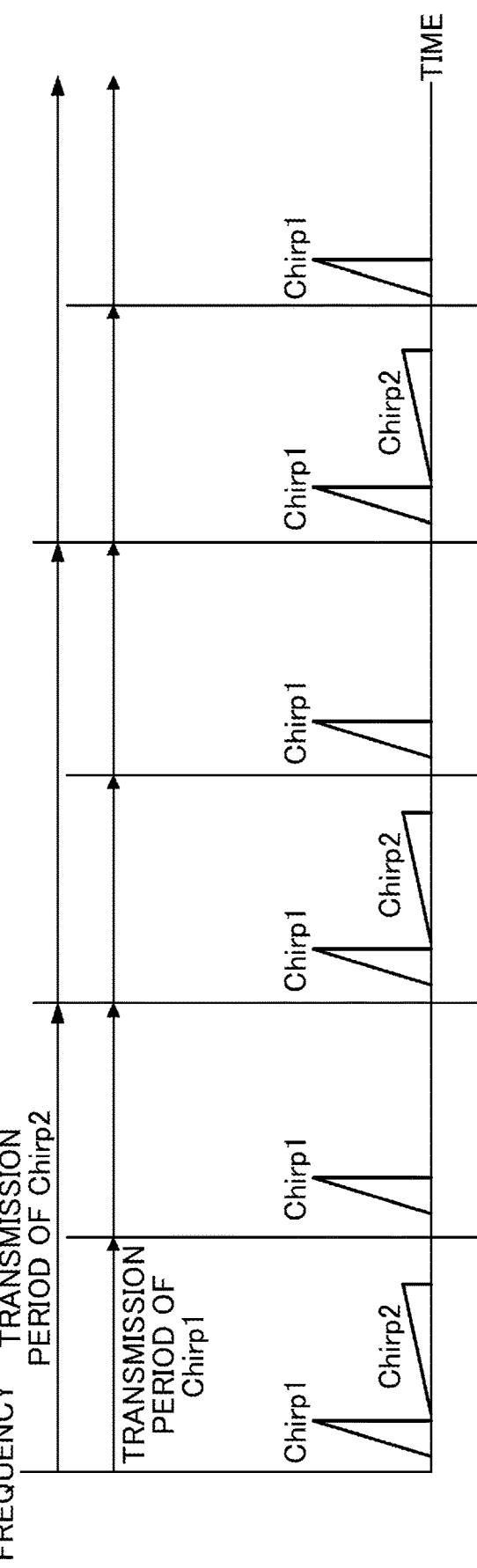
FIG. 16 is a diagram illustrating an example of two types of radio signals.

Next, a specific example of radio signals transmitted from the radar device 210 by each of the radar control unit 410 and the radar control unit 1510 controlling the radar device 210 will be described. FIG. 16 is a diagram illustrating an example of two types of radio signals.

In FIG. 16, the horizontal axis represents the time, and the vertical axis represents the frequency. In addition, in FIG. 16, Chirp 1 represents a radio signal transmitted from the radar device 210 by the radar control unit 410 controlling the radar device 210. In addition, in FIG. 16, Chirp 2 represents a radio signal transmitted from the radar device 210 by the radar control unit 1510 controlling the radar device 210.

As illustrated in FIG. 16, in order to detect a movement of the hand of the user 110 with a higher distance resolution, Chirp 1 is controlled so as to broaden the occupied bandwidth of the radio signal to be transmitted. On the other hand, in order to detect the trunk of the user 110 at a position further than the position of the hand of the user 110, Chirp 2 is controlled so as to narrow down the occupied bandwidth of the radio signal to be transmitted.

In addition, in order to detect a movement of the hand of the user 110 with a higher time resolution, the speed of the movement being faster than the trunk of the user 110, Chirp 1 is controlled so as to shorten the transmission period of the radio signal. On the other hand, in order to detect a movement of the trunk of the user 110 with a lower time resolution, the speed of the movement being slower than the hand of the user 110, Chirp 2 is controlled so as to lengthen the transmission period of the radio signal.

Conclusion

As is clear from the above description, the signal processing device included in the mobile terminal 100 in the second embodiment is configured to:

transmit radio signals for detecting an object moving for a gesture (a first object), and radio signals for detecting an object other than the object moving for the gesture and positioned at a position farther than the object moving for the gesture (a second object);

transmit the radio signals for detecting the object moving for the gesture (the first object) in shorter periods than periods for the radio signals for detecting the object other than the object moving for the gesture and positioned at the position farther than the object moving for the gesture (the second object);

transmit the radio signals for detecting the object moving for the gesture (the first object) with a broader occupied bandwidth than a bandwidth for the radio signals for detecting the object other than the object moving for the gesture and positioned at the position farther than the object moving for the gesture (the second object); and be connected to a receiver to receive a reflection wave from the object moving for the gesture (the first object), and to a receiver to receive a reflection wave from the object other than the object moving for the gesture and positioned at the position farther than the object moving for the gesture (the second object).

In this way, in the second embodiment, the radar device is configured to be capable of detecting an object other than an object moving for a gesture (a first object) and an object positioned at a position farther than the object moving for the gesture (a second object), and a range from a position away from the second object by a predetermined distance in the direction of the radar device to the radar device is set as a detection range of the first object. Accordingly, by the second embodiment, it becomes possible to avoid including positional information on an object other than an object moving for a gesture in the group of positional information for recognition, and thereby, the recognition accuracy of a gesture can be further improved.

Third Embodiment

In the respective embodiments described above, although processing in the case where a reflection signal is not received for a certain period of time has not been mentioned, the distinguishing unit 441 may determine that a gesture ends, for example, in the case where the reflection signal is not received for a certain period of time.

In addition, in the respective embodiments described above, the distance range extraction unit 442 has been described as a unit that determines whether or not the second depth difference exceeds a threshold value, and if the depth is determined to be exceeding, deletes the depth data. At this time, the threshold value used for the determination is assumed to be fixed. However, the threshold value used by the distance range extraction unit 442 upon determining whether or not the second depth difference exceeds the threshold value may be dynamically changed, for example, depending on the minimum z-coordinate.

In general, as the distance between the radar device 210 and an object moving for a gesture becomes longer, the intensity of a radio signal is attenuated more and the intensity of the reflection signal becomes lower. Therefore, the detection accuracy of an object moving for a gesture varies depending on the z-coordinate of the object moving for the gesture, and in the case of the threshold value being small, there is a likelihood that necessary depth data is deleted.

In view of such a matter, the distance range extraction unit 442 may increase the threshold value, for example, in the case where the value of the minimum z-coordinate is great, and decrease the threshold value in the case where the value of the minimum z-coordinate is small.

In addition, in the respective embodiments described above, although the time range extraction unit 443 has been described to have fixed deletion ratios (p % and q %), the deletion ratios (p % and q %) may be changed depending on the complexity of a trajectory of an object moving for a gesture. Here, the complexity of the trajectory of an object moving for a gesture can be obtained by, for example, adding the absolute values of the movement vectors (the movement amounts of the object moving for a gesture) at the respective times on a plane substantially orthogonal to the z-axis direction, based on the positional information (x-coordinate, y-coordinate) at the respective times.

Then, in the case where the trajectory of the object moving for the gesture is complicated (in the case where the sum of the movement amounts of the object is great), the time range extraction unit 443 reduces the deletion ratios (p % and q %) (i.e., broadens the time range to be extracted). In addition, in the case where the trajectory of the object moving for the gesture is simple (in the case where the sum of the movement amounts of the object is small), the time range extraction unit 443 increases the deletion ratios (p % and q %) (i.e., narrows the time range to be extracted).

In addition, in the second embodiment described above, in order to detect the position of the hand of the user 110 and the position of the trunk of the user 110, a configuration to transmit two types of radio signals is adopted. However, the configuration for detecting each of the position of the hand of the user 110 and the position of the trunk of the user 110 is not limited as such. For example, upon detecting a movement of an object, instead of calculating the difference between adjacent coordinate data, it may be configured to calculate a difference of results of weighted addition of coordinate data for the past m times according to weighting parameters, and in addition, execute the following adjustments:

when detecting the position of the hand of the user 110 (i.e., the position of an object having a faster movement speed), the weighting parameter of the near past is increased and the weighting parameter of the far past is decreased; and when detecting the position of the trunk of the user 110 (i.e., the position of an object having a slower movement speed), the weighting parameter of the near past is decreased and the weighting parameter of the far past is increased, so as to detect each of the position of the hand of the user 110 and the position of the trunk of the user 110.

However, such an adjustment method is an example, and another method may be used as long as the method is for detecting and distinguishing two moving objects among an object having a faster movement speed and positioned at a shorter distance, and an object having a slower movement speed and positioned at a longer distance.

In addition, in the respective embodiments described above, although it has been described that an object moving for a gesture is the hand of the user 110, the object moving for a gesture is not limited to the hand of the user 110. The object may be a part other than the hand of the user 110, or may be an object held by the user 110 (e.g., a baton, etc.).

Note that the present invention is not limited to the configurations described in the above embodiments and combinations with other elements. These points can be changed without departing from the scope of the present invention, and can be appropriately specified according to the application form.

What is claimed is:

1. A signal processing method executed by a signal processing device connected to a radio device that transmits radio waves in given periods and receives reflection waves and configured to process signals of the reflection waves, the signal processing method comprising:

obtaining positional information on a moving object at respective times based on the signals of the reflection waves;

identifying a coordinate that is a coordinate in an axis in a transmission direction of the radio waves, and satisfies an end condition of a gesture from among the obtained positional information at the respective times; and extracting a group of consecutive coordinates including the identified coordinate as an end point, wherein the identifying of the coordinate that satisfies the end condition of the gesture includes:

calculating a difference between coordinates of an endpoint candidate and coordinates at the respective times before the coordinates of the endpoint candidate, wherein each of the coordinates of the axis in the transmission direction of the radio waves included in the obtained positional information at the respective times is set as the endpoint candidate; and identifying, in a case where a number of times at which the calculated difference is greater than or equal to a threshold value exceeds a certain number of times, a coordinate among the endpoint candidates as a coordinate satisfying the end condition of the gesture.

2. The signal processing method as claimed in claim 1, wherein the obtaining of the positional information on the moving object at the respective times includes obtaining first positional information, a difference between the first positional information and adjacent positional information being greater than or equal to a threshold value, from among the positional information at the respective times calculated based on the signals of the reflection waves, as the positional information on the moving object at the respective times.

3. The signal processing method as claimed in claim 1, the method further comprising:

deleting first coordinates from among the extracted group of coordinates, a difference between the first coordinates and a minimum coordinate exceeding a given distance range.

4. The signal processing method as claimed in claim 3, the method further comprising:

extracting coordinates included in a given time range from among the group of coordinates after the deleting; and outputting corresponding positional information as a group of positional information for recognition.

5. The signal processing method as claimed in claim 4, wherein the outputting of the corresponding positional information as the group of positional information for recognition includes:

obtaining coordinates in an axis in a horizontal direction and in an axis in a vertical direction, the axes forming a plane substantially orthogonal to the axis in the transmission direction of the radio waves, from among the positional information corresponding to the group of coordinates after the deleting;

adding up movement amounts of the object in the horizontal direction and the vertical direction at the respective times, based on the obtained coordinates in the axis in the horizontal direction and in the axis in the vertical direction; and changing the given time range based on the added-up movement amount.

6. The signal processing method as claimed in claim 5, where the given time range is set broader as the added-up movement amount is greater, and the given time range is set narrower as the added-up movement amount is smaller.

7. The signal processing method as claimed in claim 1, wherein the obtaining of the positional information on the moving object at the respective times includes distinctively obtaining positional information on a first object and on a second object that has a greater distance from the radio device and has a slower movement speed than the first object, at the respective times.

8. The signal processing method as claimed in claim 7, wherein the radio device transmits a first radio wave and a second radio wave with different occupied bandwidths and transmission periods, and wherein the obtaining of the positional information on the moving object at the respective times includes:

obtaining the positional information on the first object at the respective times, based on the signals of the reflection waves corresponding to the first radio wave with a narrower occupied bandwidth and a shorter transmission period than the second radio wave; and obtaining the positional information on the second object at the respective times, based on the signals of the reflection waves corresponding to the second radio wave with a wider occupied bandwidth and a longer transmission period than the first radio wave.

9. The signal processing method as claimed in claim 7, wherein the obtaining of the positional information on the moving object at the respective times includes distinctively obtaining the positional information on the first object at the respective times and the positional information on the second object at the respective times, by processing the signals of the reflection waves by different weighting parameters.

10. The signal processing method as claimed in claim 7, wherein the obtaining of the positional information on the moving object at the respective times includes calculating a detection range of the first object in the transmission direction of the radio waves upon obtaining the positional information on the first object at the respective times, based on the positional information on the second object at the respective times.

11. The signal processing method as claimed in claim 7, wherein the obtaining of the positional information on the moving object at the respective times includes setting a range to be excluded from detection based on the positional information on the second object at the respective times, to identify the positional information to be deleted as being excluded from detection, upon obtaining the positional information on the first object at the respective times.

12. A signal processing device connected to a radio device that transmits radio waves in given periods and receives reflection waves and configured to process signals of the reflection waves, the signal processing device comprising:

a memory; and a processor configured to:

obtain positional information on a moving object at respective times based on the signals of the reflection waves;

identify a coordinate that is a coordinate in an axis in a transmission direction of the radio waves, and satisfies an end condition of a gesture from among the obtained positional information at the respective times; and extract a group of consecutive coordinates including the identified coordinate as an end point, wherein the processor of the signal processing device that identifies the coordinate that satisfies the end condition of the gesture is configured to:

calculate a difference between coordinates of an endpoint candidate and coordinates at the respective times before the coordinates of the endpoint candidate, wherein each of the coordinates of the axis in the transmission direction of the radio waves included in the obtained positional information at the respective times is set as the endpoint candidate; and identify, in a case where a number of times at which the calculated difference is greater than or equal to a threshold value exceeds a certain number of times, a coordinate among the endpoint candidates as a coordinate satisfying the end condition of the gesture.

13. A gesture recognition system comprising:

a radio device configured to transmit radio waves in given periods and receive reflection waves;

the signal processing device as claimed in claim 12; and a recognition device including a memory and a processor configured to recognize a gesture based on the signals processed by the signal processing device.

14. The gesture recognition system as claimed in claim 13, wherein the recognition device is further configured to execute displaying corresponding to the recognized gesture or execute an operation corresponding to the recognized gesture.

15. The gesture recognition system as claimed in claim 13, wherein the processor of the signal processing device that obtains the positional information on the moving object at the respective times is configured to obtain first positional information, a difference between the first positional information and adjacent positional information being greater than or equal to a threshold value, from among the positional information at the respective times calculated based on the signals of the reflection waves, as the positional information on the moving object at the respective times.

16. The gesture recognition system as claimed in claim 15, wherein first coordinates from among the extracted group of coordinates are deleted, a difference between the first coordinates and a minimum coordinate exceeding a given distance range.

17. The gesture recognition system as claimed in claim 16, wherein coordinates included in a given time range from among the group of coordinates after the deletion are extracted; and corresponding positional information as a group of positional information for recognition is output.

18. The gesture recognition system as claimed in claim 13, wherein the processor of the signal processing device that obtains the positional information on the moving object at the respective times is configured to distinctively obtain positional information on a first object and on a second object that has a greater distance from the radio device and has a slower movement speed than the first object, at the respective times.

19. The gesture recognition system as claimed in claim 18, wherein the processor of the signal processing device that obtains positional information on the moving object at the respective times is configured to set a range to be excluded from detection based on the positional information on the second object at the respective times, to identify the positional information to be deleted as being excluded from detection, upon obtaining the positional information on the first object at the respective times.

20. A non-transitory computer-readable recording medium having computer-readable instructions stored thereon, which, when executed, cause a computer included in a signal processing device that is connected to a radio device configured to transmit radio waves in given periods and receive reflection waves and is configured to process signals of the reflection waves to execute a process comprising:

obtaining positional information on a moving object at respective times based on the signals of the reflection waves;

identifying a coordinate that is a coordinate in an axis in a transmission direction of the radio waves, and satisfies an end condition of a gesture from among the obtained positional information at the respective times; and extracting a group of consecutive coordinates including the identified coordinate as an end point, wherein the processor of the signal processing device that identifies the coordinate that satisfies the end condition of the gesture is configured to:

calculate a difference between coordinates of an endpoint candidate and coordinates at the respective times before the coordinates of the endpoint candidate, wherein each of the coordinates of the axis in the transmission direction of the radio waves included in the obtained positional information at the respective times is set as the endpoint candidate; and identify, in a case where a number of times at which the calculated difference is greater than or equal to a threshold value exceeds a certain number of times, a coordinate among the endpoint candidates as a coordinate satisfying the end condition of the gesture.

\* \* \* \* \*